United States Patent [19]

Craig et al.

[11] 3,876,805

[45] Apr. 8, 1975

[54] DOUGH CONDITIONER PRODUCT AND PROCESS

[75] Inventors: Theodore W. Craig, Lafayette; Clayton A. Kempf, Moraga, both of Calif.; John C. Colmey, Stamford, Conn.

[73] Assignee: Foremost-McKesson, Inc., San Francisco, Calif.

[22] Filed: Nov. 1, 1972

[21] Appl. No.: 302,748

[52] U.S. Cl................ 426/23; 260/112 R; 426/187; 426/212; 426/239; 426/356; 426/364
[51] Int. Cl........ A21d 2/26; A21d 2/28; A21d 2/16
[58] Field of Search ............ 426/23, 212, 185, 187, 426/356, 239, 364; 260/112 R

[56] References Cited
UNITED STATES PATENTS

| | | | |
|---|---|---|---|
| 3,053,666 | 9/1962 | Henika et al. | 426/23 |
| 3,447,930 | 6/1969 | Francis | 426/23.9 |

*Primary Examiner*—James R. Hoffman
*Attorney, Agent, or Firm*—Flehr, Hohbach, Test, Albritton & Herbert

[57] ABSTRACT

Dough developer and conditioner products especially adapted to the bakery trade are prepared from whey protein concentrates obtained by particular membrane filtration processes to remove lactose and mineral salts. Natural dough conditioners and developers are prepared by mixing the whey protein concentrates with a gluten activating agent from the group of edible sulfhydryl reducing substances (cysteine, glutathione and sulfite salts). Complete or "total" dough conditioners are prepared by blending the whey protein concentrates with dough conditioning agents selected from the general group of edible fatty acids surfactants (mono/diglycerides-, ethoxylated monoglycerides-, and polyoxyethylene sorbitan derivatives- of long chain fatty acids; sodium and calcium stearoyl lactylates) and drying or solidifying the blends to produce free-flowing protein concentrates possessing emulsifying and dough conditioning properties. Such total dough conditioners can be used as is, or including one of the edible sulfhydryl reducing substances. In all forms of the described dough developer and conditioner products, the protein content possesses an unexpectedly high degree of sulfhydryl activity in the form of active available —SH groups, thus enabling such products to be effectively employed in dough development and conditioning reactions in various bakery processes.

28 Claims, 2 Drawing Figures

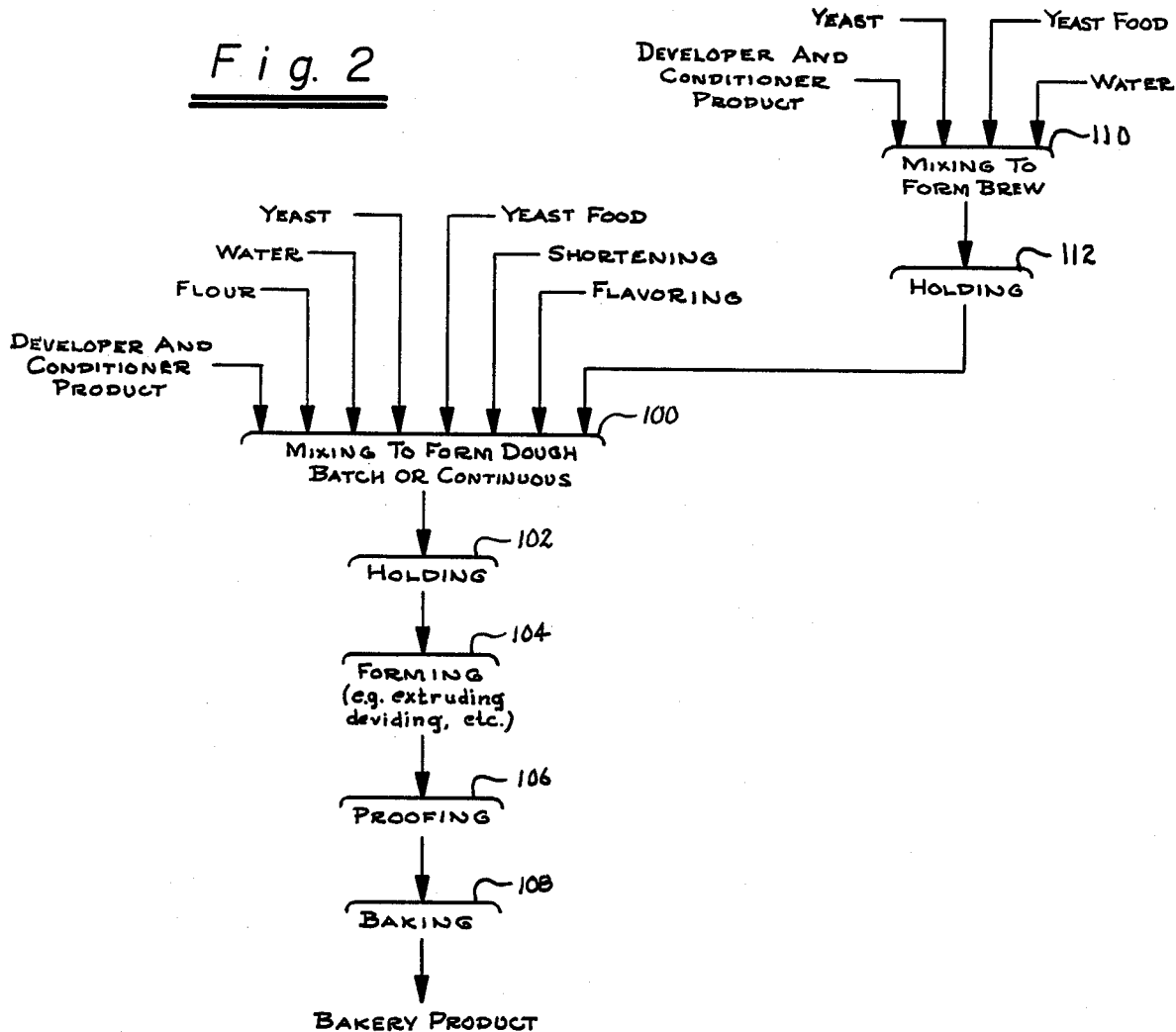

DOUGH CONDITIONER PRODUCT AND PROCESS

Method for producing the described dough developer and conditioner products involving at least one membrane filtration step to obtain a protein rich fraction which may be concentrated, dried and mixed with an added quantity of the sulfhydryl reducing substance. Alternatively, the protein rich fraction can be mixed or blended with the dough conditioning agents and, if desired, with one of the edible sulfhydryl reducing substances to provide the complete or total dough conditioner products. Final dry products are produced by wet blending and spray drying, by hot mixing and cooling to solidify, or by dry blending.

Bakery processing employing the described dough developer and conditioner products in the proportion of 0.5 to 2.0% on the weight of the flour. The developer and conditioner products are mixed with conventional dough ingredients (viz., flour, water yeast, etc.) during the forming of the dough, and function therein, due to the sulfhydryl activity of the whey protein, as processstable biochemical gluten activating and dough conditioning agents in virtually any bakery process (batch or continuous) to produce bakery goods (leavened or unleavened) of high quality.

BACKGROUND OF THE INVENTION

Liquid wheys, (e.g., from the manufacture of cheese or casein) are known to contain a substantial portion of whey protein, ranging from 10 to 20% on a dry solids basis. Since whey protein is naturally soluble in the aqueous serum within which it is contained, procedures to isolate the protein generally depend on processes to coagulate the protein to thereby change its condition from one of solution or suspension to one of precipitation. Conventionally, such coagulation is caused by an irreversible chemical change known as denaturation, which process is usually carried out by heat (also by acid, alkali, or ultra violet radiation), to a point where original properties of the protein are permanently changed. Thus, Jenness[1] has pointed out that whey proteins when heat denatured exhibit an increase in the number of —SH groups. The protein is changed in configuration, probably an unfolding, so that an increase in the activity of the —SH groups is noted. This —SH group activity is thought to reside in the $\beta$ lactalbumin component of the whey protein ($\alpha$ lactalbumin appears to be lacking in —SH groups). Upon heat treatment, the —SH groups of $\beta$ lactoglobulin are activated to the extent that most are destroyed by atmospheric oxygen if the heat treatment is conducted in air. The net result is a loss in —SH group activity. Furthermore, the presence of even trace (catalytic) amounts of common elements during heating (e.g., copper) causes the loss to be virtually complete during the heating process itself. By way of illustration, commercially available lactalbumin (about 80 to 90% whey protein) which has been heat denatured and vat precipitated, possesses virtually no sulfhydryl activity in terms of active, available —SH groups.

[1]Jenness, R. "Effects of Heat Treatment on Serum Proteins", Agr. and Food Chem. 2(2), 75 (1954)

As indicated, commercial processes to obtain usable fractions from liquid whey generally involve some form of heat concentration. One such process (see U.S. Pat. No. 2,439,612) involves preconcentrating the whey by vacuum evaporation, then crystallizing the lactose from the concentrate and separating the lactose crystals from the mother liquid. The degree of denaturation of the protein fraction remaining in the mother liquid is dependent upon time and temperature factors during the processing. A substantial amount of denaturation is generally considered desirable to facilitate harvesting the lactose crystals. The protein containing liquid from which the lactose has been removed has been spray dried and sold as an animal feed, but its usefulness is limited partly by the degree of protein denaturation and by the high salt content. Liquid wheys can also be concentrated by methods other than vacuum evaporation, for example, the technique of reverse osmosis has been applied to concentrate wheys without heat treatment. However, the presence of undenatured whey protein has been found to interfere with effective and easy separation of the lactose crystals.

Recently several processes have been deeveloped to obtain whey protein concentrates wherein a substantial proportion of the heat-denaturable protein is retained in substantially undenatured form. A specific procedure for this purpose is disclosed in Francis U.S. Pat. No. 3,447,930 wherein liquid whey derived from Cheddar or cottage cheese manufacture is subjected to at least one stage of membrane electrodialysis to reduce the salt content of the whey, following which a substantial portion of the lactose is removed by crystallization. Upon concentrating and spray drying the resultant liquid, whey protein concentrates are obtained, having a protein content of the order of 30 to 45%, on a dry solids basis.

Another specific process for obtaining a whey protein concentrate wherein the protein content remains in substantially undenatured form, is disclosed in copending Zanzig et al. application, Ser. No. 289,364, filed Sept. 15, 1972. As therein disclosed, liquid whey is subjected to at least one stage of membrane ultrafiltration to produce a protein enriched fraction. Such fraction (which is free of part of the lactose as well as part of the water, salts and non-protein nitrogen constituents) is subjected to further processing to crystallize or remove the original lactose. The resultant protein enriched fraction is either processed directly to a dry product or subjected to a further stage of membrane filtration, either ultrafiltration or gel filtration, or both, to produce protein rich fractions containing a still higher protein content. The described technique enables the processing of liquid whey to obtain protein rich fractions containing 35 to 70% protein, on a dry weight basis.

In the procedures of both the Francis patent and the Zanzig et al. application, care is taken to prevent whey from being subjected to excessive chemical or heat treatment which would tend to denature or alter the whey protein.

The foregoing processes to produce both protein and lactose concentrates, generally reflect the industry-wide concern for the prodigious quantities of fluid whey derived from the processing of both Cheddar and cottage type chesses. Since only about one-third of such fluid whey is converted to commercial purposes, the remainder presents a problem of waste disposal which through dumping into streams, lakes and sewage disposal systems, contributes to pollution. Since most commercially available whey protein concentrates contain protein in denatured or insoluble form, the pollution problem is a matter of great concern. The Francis and Zanzig et al. procedures tend to mitigate this problem through retention of the soluble characteristic of the protein, so that the resultant whey protein concentrates can be utilized in soluble form in the beverage and baby food industries.

The use potential of whey protein concentrates in the baking industry has also been recently investigated. It has been concluded essential, however, that the protein content be in substantially denatured form if loss of volume and other undesirable baking characteristics are to be avoided. It has been particularly concluded that whey protein concentrates in undenatured form are unsatisfactory for use in bread processing. On the other hand, the problems associated with use of the insoluble conventionally denatured whey protein concentrates in dough or bakery processes (e.g., inflexibility of use, difficult mixing, high mineral salt content, etc.) are well known to the baking technologist. As a result, whey protein concentrates have been employed on a very limited basis, at best, in the baking industry.

From the foregoing, it will be apparent that an improved utilization of whey protein concentrates in the baking industry, as well as elsewhere, is greatly to be desired.

SUMMARY OF THE INVENTION AND OBJECTS

This invention relates generally to dough developer and conditioner products for use in the bakery trade, wherein use is made of specially prepared whey protein concentrates and to methods for their production. It additionally relates to the preparation of complete or total dough developer and conditioner products based on such whey protein concentrates, and to the use of such products in either batch or continuous bakery processes for the production of leavened, partially leavened, or unleavened bakery products.

In general, it is an object of the present invention to provide improved whey protein concentrates, which are both water soluble and gluten reactive in the sense of substantial sulfhydryl activity, and which are particularly adapted for use in the bakery trade as dough developers and conditioners.

It is a particular object of the invention to provide an improved process for producing dough developer and conditioner products of the character described, utilizing whey protein concentrates.

Another object of the invention is to provide a new dough developer and conditioner product, in the form of a modified gluten reactive water soluble protein concentrate, which possesses essentialy all of the dough developing, emulsifying and conditioning properties necessary to the bakery process in which it is utilized.

Still another object of the invention is to provide a dough developer and conditioner product in the form of a modified gluten reactive water soluble protein concentrate, which may be used alone or in conjunction with an edible sulfhydryl reducing substance.

Another object of the invention is to provide an improvement in bakery processing, in which optimum dough and product characteristics are developed in a novel manner through use of gluten reactive water soluble protein concentrates.

As a general statement, the present invention is predicated on our discovery that whey protein concentrates obtained by processing involving at least one membrane filtration step, as in the aforementioned Francis U.S. Pat. No. 3,447,930 and particularly the Zanzig et al. application, Ser. No. 289,364 possess a sufficient degree of sulfhydryl activity to perform effectively as dough developing and conditioning agents, or components of such agents, in various bakery applications. Specifically, we have found that whey protein concentrates obtained by such processing, in the concentrated or dried form, possess a degree of sulfhydryl activity in terms of active available —SH groups at a 1% protein level on the flour in a dough system, equivalent to the sulfhydryl activity of 10 to 50 ppm of L-cysteine-hydrochloride in such dough system. By way of illustration, such whey protein concentrates may be added directly to the mixing step of a conventional batch or continuous mix dough process, in amounts ranging from 0.5 to 2.0% on the weight of the flour in a standard dough formula, to provide additional sulfhydryl activity within the described range. We have additionally found that such whey protein concentrates are in a form which enables further processing to produce dough developer and conditioner products which unexpectedly provide all desired or essential developing, emulsifying and conditioning properties for a given dough system, in a single additive composition.

We have specifically found that the described whey protein concentrates can be mixed or blended with various dough conditioning agents selected from the group of edible fatty acid surfactants, and the resulting blend or mixture concentrated and processed to an essentially dry condition for direct use as additives in the form of a complete or total dough developer and conditioner. Specific processing for such purpose includes wet blending and spray drying a concentrated blend of the whey protein concentrate and the dough conditioning agent, or alternatively hot mixing and cooling the mixture of such ingredients. Improved products derived either from the whey protein concentrates, alone, or the mixture or blend of such products with the above dough conditioning agents, are obtained by additionally blending the same with a relatively small amount of an edible sulfhydryl agent, such as L-cysteine hydrochloride.

The dough developer and conditioner products obtained by the foregoing processing are characterized by a protein content which is in water soluble, substantially native form, thus giving rise to functional properties not heretofore possible, such as good dispersibility in dough systems, an unusual degree of gluten reactivity in the form of active available —SH groups, an unusual degree of flexibility of use due to the natural distribution of such —SH groups, substantially improved qualities of stability and tolerance to process variables (e.g., brew stability), reduced salt content and nonprotein nitrogen content, and improvements in color and flavor in the finished product. When used in combined form as a total dough conditioner and developer, the components additionally cooperate with one another to provide a cumulative or synergistic effect which provides measurable improvements in process and product characteristics.

Other objects and features of the invention will appear from the following description in which the preferred embodiments have been set forth in conjunction with the accompanying drawing.

BRIEF DESCRIPTION OF THE DRAWING

FIG. 2 is a flow sheet illustrating the use of the dough developer and conditioner products in bakery processing according to the invention.

DESCRIPTION OF THE PREFERRED EMBODIMENTS

Figure 1:
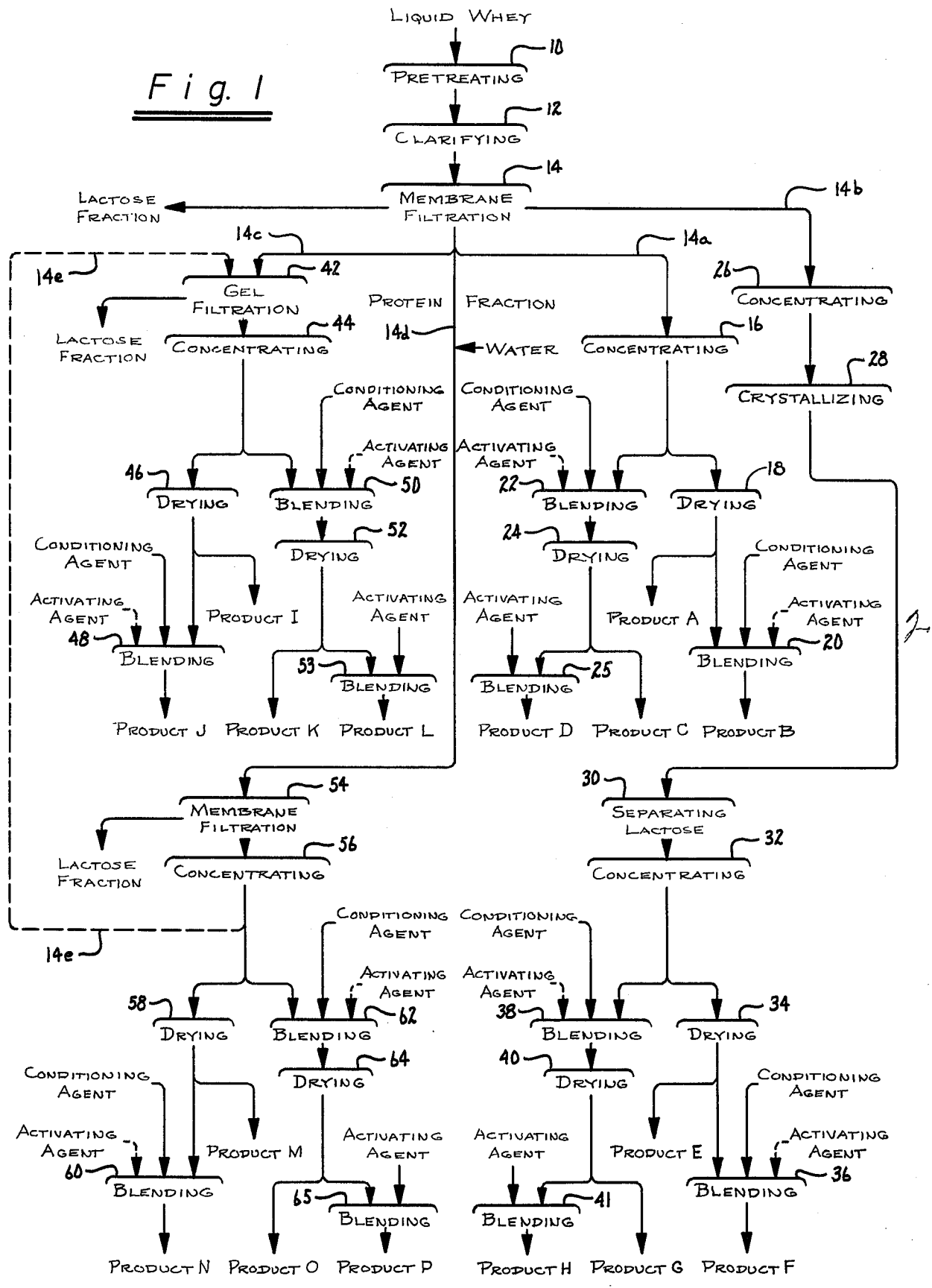
FIG. 1 is a flow sheet illustrating the method of producing the dough conditioner and developer products of the invention.

Reference has been made to membrane filtration by means of the electrodialysis technique disclosed in Francis U.S. Pat. No. 3,447,930. As therein disclosed, protein-containing liquid wheys are concentrated to a solids content of from 20 to 30% at temperatures below about 155°F., following which the whey is adjusted to a pH of about 6.2 to 6.4 and subjected to clarifying in a suitable centrifugal clarifier. The whey concentrate is subjected to electrodialysis to demineralize the whey and substantially reduce the ash content. The equipment employed for this purpose may be as described in the Francis patents (see U.S. Pat. Nos. 2,730,768, 2,731,411 and 2,800,455), or preferably as described in the later Francis et al. U.S. Pat. No. 3,544,436. Briefly, the latter equipment employs a stack comprising a plurality of cells connected in parallel, each cell including an anion and a cation membrane. A plurality of grids formed of suitable material (e.g., polyethylene) provide circuitous flow paths, in series, for whey flowing therethrough concurrently to a brine stream. As disclosed in the Francis and Francis et al. U.S. Pat. Nos. 3,447,930 and 3,544,436, the electrodialysis processing reduces the ash content as much as 90 to 95%. Following electrodialysis, the whey stream is subjected to further concentration and removal of lactose by crystallization. As noted previously, protein rich fractions obtained by the described procedure have a protein content substantially in soluble undenatured form, ranging from about 30 to 45% on a dry solids basis.

Reference has also been made to membrane filtration by means of the ultrafiltration and/or gel filtration technique, as disclosed in the Zanzig et al. application Ser. No. 289,364. The ultrafiltration technique described therein is a form of molecular filtration in which the liquid whey is forced through a membrane under pressure to remove a permeate consisting of water together with lactose, mineral salts, and other small water-soluble molecules. Such processing results in the concentration of the larger protein molecules on the pressure side of the membrane. Various materials are disclosed for use as the membrane, including particularly cellulose acetate. According to the Zanzig et al. disclosure, one stage of ultrafiltration equipment may have as many as five serially connected tubular modules in such a manner that the feed flows successively from one module to the next, while the liquid effluent from all the modules (i.e., the fraction passing through the membranes) is merged for separate discharge. Typically, pressures employed to obtain whey protein concentrates may be on the order of 15 to 500 psig.

Gel filtration as described in the Zanzig et al. disclosure, is based on the molecular sieve effect exhibited by certain types of gels. The effect is such that the smaller lactose and salt molecules can penetrate the gel matrix, while the larger protein molecules are excluded. In a typical columnar process, employing pre-hydrated beadlets of gel resin tightly packed in the column, liquid whey and water are alternatively pumped through the gel resin bed. As the liquid whey flows through the bed, the larger protein molecules do not penetrate the resin, are consequently unretarded in flow, and discharge from the column ahead of the small lactose and salt molecules which do penetrate the resin and are retarded in the flow. By using a system containing suitable detection devices, the protein-containing effluent may be isolated from the lactose and salt-containing effluent. Water is used to wash out the absorbed smaller molecules, thus automatically regenerating the gel bed for repetitive separation cycles. Suitable gels for the described purposes in the form of modified dextron products (cross-linked to give a three-dimensional network of polysaccharide chains), and various cross-linked polyacrylamides, are described in the Zanzig et al. disclosure.

As further disclosed in the Zanzig et al. disclosure, Ser. No. 289,364, liquid wheys from cheese or casein manufacture are initially pasteurized at a time-temperature cycle to avoid denaturization of the natural or native whey protein, following which the pasteurized whey is subjected to centrifugal clarification to remove cream. Thereafter the clarified whey is subjected to one or more stages of membrane ultrafiltration to obtain a protein rich fraction, and also a lactose rich fraction. In processing where more than one stage of membrane ultrafiltration is employed (to obtain a whey protein concentrate is diluted to facilitate the second stage of membrane ultrafiltration.

As additionally disclosed in Zanzig et al., the stages of ultrafiltration may be supplemented by one or more stages of gel filtration. Although not necessary, the supplemental stages of gel filtration are useful to produce whey protein concentrates having higher protein levels, for example, ranging up to 65 or 80% whey protein. In general, processing according to Zanzig et al will produce protein rich whey concentrates containing about 35 to 80% protein on a dry weight basis. As hereinafter explained, it is important that the protein content of these whey protein concentrates be substantially in undenatured, water soluble form.

In accordance with the present invention, high protein whey concentrates obtained from the membrane filtration techniques, as disclosed by Francis or Zanzig et al., are effectively employed in processing to produce water soluble, gluten reactive dough developer and conditioner products, especially adapted for use in the bakery trade. Particular processing for such purposes is illustrated in the flow sheet of the drawing, wherein the initial processing steps generally correspond to those described above to obtain the whey protein concentrates. Thus, referring particularly to FIG. 1, liquid whey is subjected to pretreatment in step 10, according to the foregoing description. Thus, step 10 represents the pasteurization and/or concentration of the whey, for example, by preheating and passing through several effects of a vacuum evaporator. During such processing, the time-temperature factors should be carefully controlled to avoid any denaturation of the whey protein. Alternatively, chemical sterilizing agents can be introduced instead of, or in conjunction with, heat pasteurization, for example, diethyl pyrocarbonate. As a practical matter, step 10 might also include passing the whey through a centrifuge to remove butter fat in the form of whey cream; and also steps to adjust the pH of the whey as might be necessary for electrodialysis. In general, the processing in step 10 represents the pretreatments in the Francis U.S. Pat. No. 3,447,930 or the Zanzig et al. application Ser. No. 289,364.

Step 12 represents clarification of the pre-treated whey, for example, by further centrifuging to remove insoluble materials present, particularly insoluble protein or residual curd fragments.

Step 14 represents the first stage of membrane filtration which, in accordance with the invention, may be carried out by any one of the techniques previously described, viz., electrodialysis or ultrafiltration. In either event, the processing step 14 serves to separate the whey into two liquid fractions, a lactose enriched fraction and a protein enriched fraction, the latter being represented in FIG. 1 by the various process streams bearing the reference numeral 14 (viz., 14a, 14b, 14c and 14d). These various process streams are illustrative of the fact that the protein enriched fraction can be treated in any one of several different ways.

The process stream represented at 14a is directly concentrated in step 16 and dried in step 18 to produce product A. Alternatively the dried product may be blended in step 20 with a liquefied (melted) dough conditioning agent as hereinafter described, to provide product B. For such purpose, ordinary spray drying equipment can be used in drying step 18, following which the spray dried product may or may not be subjected to instantizing to convert the product into the form of porous aggregates before mixing with the melted dough conditioning agent. Such aggregates coated with the melted conditioning agent are allowed to cool and solidify to form the final product. Alternatively, the solidified product may also be dry blended with a gluten activating agent to provide the modified product B (represented by the dotted lines in step 20).

In a somewhat preferred procedure, the whey protein concentrate from step 16 is wet blended with the dough conditioning agent in step 22 and the blended materials co-spray dried in step 24 to form product C. A modified product C may also be prepared by introducing a gluten activating agent into the wet blending step 20, prior to the spray drying in step 22. Since this procedure results in a considerable loss of activity as respects the activating agent (approximately 50% for cysteine), processing in accordance with step 22 requires an additional amount of the activating agent. Consequently, a preferred procedure is to dry blend the gluten activating agent with the spray dried product in step 25 to produce the product D.

The sequence of processing illustrated with respect to process stream 14b is particularly illustrative of a first stage of membrane filtration in step 14, carried out by electrodialysis. For such purpose, the pH of the clarified whey in step 14 is adjusted to about 6.2 to 6.4, and the applied voltage and current in the electrodialysis step controlled to provide electrodialized whey leaving step 14 having a pH in the range from about 4.8 to 5.2. The enriched protein fraction from step 14 is subsequently concentrated in step 26, for example to obtain a solids concentration of about 40 to 70%, following which the lactose is permitted crystallize in step 28. Thereafter the lactose crystals are removed in step 30 and preferably subjected to further concentration in step 32. Concentrated electrodialized whey can now be subjected to further processing, similar to that described in conjunction with steps 18 through 25, to produce the products E, F, G and H. Thus, the concentrate from step 32 can be spray dried in step 34 to provide product E, or blended with the conditioning and/or activating agent in step 36 to provide various products F.

In like fashion, the concentrated whey protein from step 32 may be wet blended with the dough conditioner (also the activating agent) in step 38, following which the blend may be co-spray dried in step 40 to provide the product G, or the latter product may be dry blended with the activating agent in step 41 to produce the product H.

Each of the processing sequences with respect to process streams 14c and 14d is based on a first stage of membrane filtration in step 14 by means of the ultrafiltration technique, for example, according to the disclosure of Zanzig et al. Ser. No. 289,364. With specific reference to process stream 14c, the liquid protein fraction from step 14 is subjected to gel filtration in step 42 to produce a high protein liquid fraction and a lactose fraction. If desired, the high protein concentrate can be subjected to a second stage of gel filtration (not shown) to obtain a concentrate fraction of even high protein content. Thereafter, the high protein fraction is concentrated in step 44 and subjected to variable processing as before. Thus, the concentrated protein fraction can be dried in step 46 to produce the product I, or alternatively, it can be blended with a dough conditioner (also the activating agent) in step 48 in processing similar to that previously described, for example, in steps 20 and 36, to produce the product J. In like fashion, the whey protein concentrate can be wet blended with the dough conditioner (also with the activating agent) in step 50, and the blend subsequently co-spray dried in step 52 to produce a product K. Alternatively, the latter product can be dry blended with the activating agent in step 53 to produce the product L.

Process stream 14d represents a further variation in the processing where the liquid protein concentrate from the first stage ultrafiltration in step 14 is subjected to a second stage of membrane ultrafiltration in step 54. As noted in the Zanzig et al. disclosure, greater efficiency in the separation of lactose and mineral salts in step 54 is obtained when the feed to this second stage of ultrafiltration is diluted with water. The diluting of water for such purpose should be substantially free of contaminants such as mineral salts or iron (e.g., deionized water which is devoid of iron). The degree of dilution will depend upon the protein content in the protein rich fraction, although in general the proportion of diluting water will be within range from about 1:1 to 3:1 with respect to the protein rich fraction. Following the second stage of ultrafiltration in step 54, the resulting high protein fraction is subjected to concentration in the step 56 and processed in the manner previously described to produce the products M, N, O and P. Thus, the concentrate can be dried in step 58 to produce the product M or blended with the dough conditioner (and also the activating agent) in step 60 to produce the product N. Alternatively, the whey protein concentrate in step 56 can be wet blended with the conditioner (also the activating agent), in step 62, and the blend spray dried in step 64 to produce the product O, or the latter product can be dry blended with the activating agent to produce the product P.

As a further variation in the processing, the high protein fraction from step 56 can be subjected to one or more stages of gel filtration, as generally represented by the flow of process stream 14e (dotted lines) to the gel filtration step 42. Thereafter, the higher protein fraction from step 42 may be subjected to the concentrating, drying and blending sequences as previously described with respect to steps 44 through 53.

In accordance with the present invention, the whey protein concentrates as represented in FIG. 1 by the products A through P, are characterized by a protein content in substantially undenatured or native form. To insure such result, the liquid whey initially introduced to processing should have all of its protein content in native or unaltered form. This means that the entering whey should not have been subjected to previous heat or chemical treatment which would tend to denature or alter the whey protein. In general, good results can be obtained through use of cottage cheese wheys having a pH (natural or altered) within the range of from about 3.5 to 5.0; also, through use of sweet wheys having a pH within the range from about 6 to 6.8. Other edible cheese wheys can likewise be employed. Generally, it is desirable to use whey in its normal fresh condition without previous storage, such as might tend to increase the lactic acid content or degrade the protein.

Assuming liquid whey source material meeting the stated conditions, it is essential that the subsequent processing to produce the dried concentrate products (viz., the products A through P) be carried out in such fashion as to avoid heat treatment which might cause denaturization of the protein. Thus, care is taken to avoid processing temperatures in excess of about 145°F., except for short periods of time (e.g., 160°F. for 16 seconds or less). Specifically, the time and temperature factors must be carefully controlled to avoid any substantial denaturization of protein. In process to electrodialyize the liquid whey in steps 10 through 14 for example, the whey concentrate being electrodialyized should be of the low heat variety. In like fashion, processing of the whey through the ultrafiltration stages as in steps 14 and 54, should be carried out at temperatures below that which might tend to deteriorate the membrane (i.e., not above about 125°F., about 75° to 125°F. being optimum).

In general, obtaining dough conditioner and developer products having the desired characteristics depends, in the first instance, on the production of whey protein concentrates which possess the cooperating properties of a relatively high protein content (i.e., from about 30 to 80% on a dry weight basis), a substantial degree of demineralization (i.e., an ash content of less than about 10% without evidence of protein alteration), and a high degree of dispersibility or solubility in aqueous solution (i.e., liquid brews, or moist doughs) to form stable colloidal dispersions. It may be generally noted that these characteristics are obtained by the described processing as represented in FIG. 1 by the first stage of membrane filtration 14 and the subsequent processing of the enriched protein fractions in the process streams 14a, 14b, 14c, 14d or 14e, as previously described herein. Thus, the processing of electrodialyized whey concentrates in process stream 14b will produce a whey protein concentrate in step 32 having its protein content in substantially soluble, undenatured form and which, on spray drying, will range from about 30 to 45% on a dry solids basis. In like fashion, drying of the whey protein concentrates produced by ultrafiltration as in process stream 14a, or ultrafiltration coupled with gel filtration, as in process stream 14c, or by multiple stages of ultrafiltration (and either with or without subsequent stages of filtration), as in the process streams 14d and 14e, will produce whey protein concentrates having a protein content in substantially soluble undenatured form, ranging from about 35 to 80% on a dry solids basis. Due to the nature of the processing, the whey protein concentrates are also substantially delactosed, having a lactose content generally less than about 30 to 35%.

It is a particular discovery and feature of the present invention that the dried whey protein concentrates, (viz., the products A through P), possess an unusually high degree of sulfhydryl activity in terms of active available —SH groups present in the protein complex. This unexpected characteristic enables the concentrate products to be effectively employed as dough developers and conditioners, either alone, or in conjunction with the dough conditioning additives and activating agents herein described. Specifically, we have found that the various concentrate products (derived as in FIG. 1) possess a degree of sulfhydryl activity in a test dough, in terms of active available —SH groups at a 1% protein level in the dough, which is at least equivalent to the sulfhydryl activity of about 10 to 50 ppm of L-cysteine hydrochloride in the same dough. In this regard, there is a distinction between —SH groups which are merely "active" and —SH groups which are both active and "available". Thus, the availability of —SH groups in a dough system can be readily determined in the laboratory in terms of reductions in mix time to peak development in the farinograph, using a standard simplified bread formula. In contrast, active —SH is chemically determined by the spectrofluorometric method involving fluorescence quenching of fluorescein mercuric acetate.

As a practical matter, it is difficult to correlate the spectrofluorometric measurements of sulphur groups with the mix time reductions obtainable through use of the whey proteins as dough developers and conditioners. Accordingly, we have found the measurement of reductions in mix time on the farinograph to be much more accurate than the chemical method for the reason that the chemically determined values (for —SH and —S—S—levels) S — substantially higher than those determined in the bread dough system. Most likely this is due to the high sensitivity of the chemical method. On the other hand, a reduction in mix time in the farinograph is a direct measure of the proportion of gluten reactive —SH groups present in the dough, and available for dough developing and maturing reactions. In this regard, due to steric considerations and the large amount of inert material in the bread doughs, only a small percentage of the total active —SH groups are truly available to provide reductions in the mix times to peak development. Also, since the reduction in peak mix time in the farinograph is readily determined with respect to use of L-cysteine hydrochloride in a dough system, the sulfhydryl activity of the whey protein concentrates can be readily stated in terms of equivalence to the sulfhydryl activity of L-cysteine hydrochloride in the same dough system.

Considering the foregoing procedure for measuring available —SH activity, it is possible to provide an equivalent measure of the sulfhydryl activity in terms of active available —SH groups, for each of the dried whey protein products, for example, as represented in the drawings at A, E, I and M. Specifically, in terms of the equivalent activity in parts ppm of L-cysteine hydrochloride, the respective products possess a measure of active available —SH groups at a 1% level of protein on the flour in the standard bread dough system, as set forth in the following Table I.

TABLE I

| Whey protein concentrate product (FIG. 1) | —SH Activity of 1% protein as ppm cysteine |
| --- | --- |
| A | 15 – 40 |
| E | 10 – 25 |
| I | 25 – 45 |
| M | 20 – 40 |

The foregoing table shows that the spray dried protein concentrates obtained by at least one stage of membrane filtration (electrodialysis or ultrafiltration) possess a degree of sulfhydryl activity equivalent to about 10 to 40 ppm L-cysteine hydrochloride in a test dough system (products A and E). When the protein concentrates are processed through an additional stage of membrane filtration or gel filtration, the table shows that they possess a degree of sulfhydryl activity equivalent to 20 to 45 ppm L-cysteine hydrochloride in such test dough system (products I and M). As a practical matter, we have determined that processing to produce the spray dried whey protein concentrates, as in FIG. 1, achieves a degree of sulfhydryl activity equivalent to from 10 to 50 ppm L-cysteine hydrochloride by the technique of measuring reduction in mix times in the farinograph, for a standard test dough system.

It may be further noted, that the liquid whey protein concentrates prior to spray drying possess substantially less sulfhydryl activity than do the spray dried products. Thus, the whey protein liquid concentrate in step 16 may have less than half the sulfhydryl activity of the spray dried product A (e.g., 14 ppm cysteine as compared to 38 ppm cysteine), for a given sample. A generally similar relationship exists between the liquid whey protein concentrate of step 44, for example, as compared with the spray dried product I (e.g., 20 ppm cysteine as compared to 38 ppm cysteine). While the indicated increase in the available —SH activity in the spray dried form of the whey protein concentrates is not clearly understood, it seems that the membrane filtration sequence, as in step 14 and subsequent steps, exposes additional —SH groups as compared to the liquid source material. Possibly some conformational change in the β lactoglobulin of the protein, achieves an unfolding of the protein with exposure of new —SH groups through breakage of the —S—S— bonds and a decrease in number of the latter, which condition is stabilized in the spray dried form as contrasted to the liquid form. Thus, we have additionally found that the spray dried protein concentrates have an unexpected high degree of stability when subsequently placed in a liquid environment, for example, a yeast brew as used in the continuous mix bread procedure.

It may also be that the increased —SH activity in the spray dried form is related to the salt and/or lactose removal in the various processing techniques as described in conjunction with FIG. 1. Thus, raw liquid whey containing protein in native form exhibits little if any available —SH activity. In contrast, the concentrated whey protein products, wherein the mineral salts and lactose are substantially removed, demonstrate a distinct increase in active available —SH groups. Since the ionic environment is influential in determining protein configurations, it could be that the membrane filtration and concentration procedures for obtaining the whey protein concentrates provide shifting electrolyte patterns which, coupled with overall ion removal, lead to substantially altered protein orientation. In any event, and regardless of explanation, the whey protein concentrates produced in accordance with the invention possess an unexpectedly high degree of sulfhydryl activity, which has been found to be particularly useful in bakery processes as hereinafter described.

Reference has previously been made to mixing or blending various dough conditioning agents with the whey protein concentrates, to thereby provide complete or total dough developer and conditioner products. Dough conditioning agents useful for this purpose are generally selected from the group of edible fatty acids surfactants and specifically those possessing emulsifying and dough conditioning properties. Included in this group are the mono and diglycerides of various fatty acids and their derivatives, and various surface active chemicals used as emulisifiers in foods, such as sorbitan and polyoxyethylene sorbitan derivatives of fatty acids. As a practical matter, we prefer to use as dough conditioners the group of dough emulsifiers including the mono and diglycerides of long chain fatty acids, and the group of dough conditioning agents including the ethoxylated monoglycerides of long chain fatty acids, the polyoxyethylene sorbitan esters of long chain fatty acids, and sodium and calcium stearoyl lactylates.

In general, the dough conditioning agents are employed in a proportion ranging from about 5 to 50% by weight of the blend or mixture with the whey protein products. Operating levels of use of these ingredients in the dough developer and conditioner products according to the invention, are set forth in the following table, wherein the preferred ranges (on a dry solids basis) are set forth in terms of the proportion of dough conditioning agent in the mixture of such agent with the protein rich fraction of whey:

TABLE II

| Dough Conditioning Agent | Operable Range % | Preferred Range % |
| --- | --- | --- |
| Mono and diglycerides of long chain fatty acids | 10 to 30 | 18 to 22 |
| Ethoxylated monoglycerides of long chain fatty acids | 5 to 15 | 8 to 12 |
| Polyoxyethylene sorbitan esters of long chain fatty acids | 5 to 20 | 8 to 12 |
| Sodium and calcium stearoyl lactylates | 20 to 45 | 30 to 35 |

The foregoing dough conditioning agents can be utilized in admixture wiht the protein concentrates either alone, or in combinations with one another. Thus, we have successfully used the mono and diglycerides of long chain fatty acids in combination with the ethoxylated monoglycerides of long chain fatty acids, also, in combination with the polyoxy ethylene sorbitan esters of long chain fatty acids. In contrast we have found that the sodium and calcium stearoyl lactylates are most effectively used alone.

As illustrated in FIG. 1, the dough conditioning agents are effectively wet blended with the whey protein concentrates, for example, in any one of steps 22, 38, 50 or 62 prior to spray drying. Desirably, the dough conditioning agent is heated (or cooled) as may be necessary to obtain a suitable viscosity, for the described wet blending step. Thereafter, wet blending is easily accomplished in any suitable mixing device, for example, a centrifugal pump feeding the ingredients to the spray dryer. Most frequently, the liquid protein concentrates and dough conditioning agents are heated above the melting point of the latter (generally below about 150°F.) to ensure rapid blending for effective spray drying, care being taken, of course, to avoid any time temperature relationship which would tend to denature the whey protein. In general, the wet blends are easily co-spray dried in any of the processing steps 24, 40, 52 or 64, to provide a substantially dry, free-flowing spray dried product.

In certain cases, it is desirable to initially spray dry the whey protein concentrate, as in any of steps 18, 34, 46 or 58 in FIG. 1, prior to mixing with the dough conditioning agent. In such case, the dried protein concentrates can be subsequently mixed with the dough conditioning agents by heating the latter to above the melting point, and coating or plating the same on the protein concentrate which serves as the substrate. Processing according to this procedure is represented in the drawing by the steps 20, 36, 48 or 60. Upon subsequently cooling the mixture, a solidified, substantially dry product is obtained.

Reference has been previously made to the use of a separate gluten activating agent in the dough developer and conditioner products of the present invention, in the form of an edible sulfhydryl reducing substance. Reducing compounds for such purpose are particularly disclosed in the Henika et al. U.S. Pat. No. 3,053,666, and generally comprise a member of the group consisting of cysteine, glutathione, sulfite salts and their mixtures. Specific agents include L-cysteine hydrochloride, glutathione and sodium bisulfite. All of these compounds are sulphur-containing type reducing agents normally occurring in foods. As noted in the Henika et al patent, they have no detrimental affect upon the flavor, nutritive value or other essential properties of final bakery products, and small amounts of one or more of these agents (0.002 to 0.0025% on the weight of the flour) have been found to accelerate development of the doughs to optimum consistency and to improve extensibility and maturity reactions in processing the doughs to final baked goods. While the use of L-cysteine hydrochloride is to be preferred, compounds related to or homologous therewith, as well as various sulfite salts and related compounds (as particularly disclosed in Henika et al. U.S. Pat. No. 3,053,666) can be satisfactorily employed.

In accordance with the present invention, a small proportion of these activating agents can be mixed or blended with the gluten reactive whey protein concentrates, to assist in the formation of complete or total dough conditioners and developers as herein described. In general, the proportion of activating agent will constitute about 0.2 to 1.0% by weight of the blend with the whey protein concentrate (dry solids basis.) As previously noted, however, less of the activating agent is required when the mixing is done in the dry so that only 0.1 to 0.5% by weight is required in a dry mixture with the protein products (viz., A through P). As a general statement, therefore, the proportion of gluten activating agents will range from 0.1 to 1.0% by weight of the mixture, wet or dry.

As illustrated in FIG. 1, the gluten activating agents can be wet blended with the protein concentrates and the dough conditioning agents, in any of the steps 22, 38, 50 or 62, prior to subsequent spray drying to produce the final products, (e.g., represented in FIG. 1 at C, G, K and O). Typically, such processing might be carried out by adding the gluten activating agent to a liquid solution containing the whey protein concentrate and conditioning agent, and spray drying the complete mixture. Alternatively, the gluten activating agent may be dry blended with a spray dried mixture of whey protein concentrate and dough conditioning agent, as in any of the steps 25, 41, 53 or 65, to provide a dry free-flowing dough developer and conditioner product having additional dough developer properties. Such product is represented in FIG. 1 at D, H, L and P.

Alternative procedures to incorporate the gluten activating agent in a blend with the spray dried whey protein concentrates are also illustrated in FIG. 1. For example, the gluten activating agent may be dispersed in a liquefied form of the dough conditioning agent (heated above the melting point) and the liquefied mixture blended with the spray dried whey protein concentrate, for example, in a conventional ribbon blender. Such processing is represented in any of the steps 20, 36, 48 or 60 in FIG. 1.

Regardless of the procedure for adding the additional amount of gluten activating agent, the general purpose is to supplement the sulfhydryl activity of the whey protein concentrate to thereby simulate affects ordinarily achieved only with much higher levels of activating agent. For example, any of the dried whey protein concentrate products represented at A, E, I or M in FIG. 1 might be blended with a small additional amount (e.g., 5 to 20 ppm) of L-cysteine hydrochloride to provide substantially the same effect in a dough system as substantially high levels of L-cysteine hydrochloride (e.g., 60 to 100 ppm). Similar results can of course be achieved in processing to produce the total dough developers and conditioners, as in the steps 25, 41, 53 and 65, to produce the products D, H, L or P. It will be appreciated that an important feature of the various dough developers and conditioner products as produced herein (represented by any of the products A through P), is the significant increase in the sulfhydryl activity of such product, obtained from the specially processed whey protein concentrate. As previously noted, this increase in sulfhydryl activity is generally equivalent in a dough system, in terms of active available SH groups, to the effect of 10 to 50 ppm L-cysteine hydrochloride in the same dough system (see Table I).

In general, assuming a dough developer and conditioner product formulated to include a whey protein concentrate product (containing both whey protein and non-protein whey derivatives), a dough conditioner agent, and a gluten activating agent, the proportions may range as follows:

|  | Percent |
| --- | --- |
| Whey protein | 10 to 65 |
| Non-protein whey derivative | 15 to 75 |
| Dough conditioning agent | 5 to 50 |
| Gluten activating agent | 0.1 to 1.0 |

The whey protein concentrate products whether used alone or in conjunction with the added dough conditioning and/or gluten activating agents, are effectively used as dough developers and conditioners in both batch or continuous bakery processes to produce various bakery goods, including both leavened and unleavened products. Processing for such purpose is schematically illustrated in the flow sheet of FIG. 2. Thus, in a batch process similar to the conventional straight dough process, conventional dough ingredients such as flour, water, yeast, yeast food, shortening, flavoring, etc., are mixed in step 100 to form a dough. It is a feature of the present invention that the developer and conditioner products, as represented by the various designated products in FIG. 1, can be routinely incorporated in the mixing in step 100 without any special procedures or additional steps to effect the incorporation. Such processing is made possible by the uniquely stable condition of the developer and conditioner products, viz., A through P in FIG. 1, derived from the whey protein concentrates. Following the mixing of the dough in step 100, the dough can be subjected to developing and conditioning reactions in a holding or fermentation step 102, thereafter, formed in step 104 into dough units, and subjected to proofing in step 106 and baking in step 108, in more or less conventional fashion. In general, the described processing to form the dough (steps 100–104), is very effectively carried out with the dough developer and conditioner products described, due to the water soluble, highly gluten-reactive character of the whey protein in such products. In particular, such processing readily obtains optimum characteristics in doughs and baked goods through reliance on the unusually high sulfhydryl activity of the whey protein achieved by the prior processing as represented in FIG. 1. Moreover, the natural distribution of active available —SH groups in the whey protein imparts a ready dispersibility of this sulfhydryl activity within the dough system, without the necessity of relying on special equipment to proportionally meter small amounts of cysteine or other chemical activating agent, as in conventional practice.

In continuous-mix (or batch) procedures, wherein use is made of a yeast brew, the developer and conditioner products of the present invention are particularly effective because of the unusually high and unexpected degree of stability of such products in aqueous environments, as represented by the liquid brews. This feature of the invention is represented in FIG. 2, where the mixing of the developer and conditioner products with the brew ingredients is shown in step 110. The stability of the developer and conditioner agents in the subsequent fermenting or holding steps related to the brew is further represented in step 112. The indicated stability of the dough developer products, based on whey protein, provides an unusual degree of flexibility of use, as compared to conventional use of cysteine and similar gluten activating agents. Thus, as is now well known, cysteine and like products undergo a substantial and rapid loss of activity in liquid brews. In contrast, the conditioner products of the present invention demonstrate a substantially improved degree of stability throughout relatively prolonged holding periods in the liquid brews, for example, as in step 112. By way of illustration, the whey protein dough developer and conditioner products of the present invention, exhibit a degree of stability and/or tolerance to chemical change in the brew of the order of 2 to 4 times that of L-cysteine hydrochloride. Such a result is a clear indication that the sulfhydryl activity of the high protein whey concentrate products is substantially more stable (in the sense of tolerance of loss of activity through oxidation in a moist atmosphere) than chemical dough developers originally of the same or equivalent sulfhydryl activity. While such enhanced chemical stability or tolerance to process variables is not easily explained, it may be a function of the natural environment from which the sulfhydryl activity is derived, that is, the whey protein. On the other hand, as noted previously, whey proteins in native unconcentrated form possess virtually no sulfhydryl activity so that, regardless of stability, they would have no utility in the present invention.

Specific examples of the present invention are set forth below. In the examples related to bakery processing, all concentrations of ingredients are expressed as percent of the flour.

EXAMPLE 1

Fresh undenatured Cheddar cheese whey (pH 5.8) was preheated about 30 seconds at 155°F and concentrated to 28% solids in vacuum evaporator at temperatures at all times below 155°F. The concentrate was cooled, and following preheating to 120°F, the pH was adjusted to 6.2 to 6.4 by the addition of potassium hydroxide. The concentrate was then subjected to clarification in a centrifuge to remove suspended insoluble casein and whey protein. The concentrate was thereafter electrodialyzed at temperatures below 100°F in a four stack demineralizing plant (Ionics, Inc.) for a period sufficient to remove about 50% of the ash content. The demineralized concentrate was further concentrated without denaturization to about 61.4% solids, and following heating to about 155° to 158°F, introduced to a crystallizing tank. Lactose was crystallized from the concentrate by gradually cooling to 100°F at a regular and even rate over a 14 hour period. The lactose crystals were removed in a centrifuge, and the partially delactosed and demineralized concentrate was further concentrated to about 48% solids in a vacuum evaporator. The resulting liquid concentrate analyzed approximately 27.3% whey protein, 56.5% lactose, and less than 8.5% ash (dry solids basis).

The whey protein concentrate was divided into three fractions which were processed as follows: (1) spray dried to produce a substantially dry, free-flowing whey protein product; (2) spray dried and mixed with 0.4% by weight of L-cysteine-hydrochloride (dry solids basis); (3) wet blended with 0.8% by weight L-cysteine-hydrochloride (dry solids basis) and spray dried to produce a substantially dry, free-flowing product.

Each of the foregoing dry protein products was added to a standard bread dough formula in a proportion such that the whey protein was at a 1% level with respect to the flour in the dough formula. Simultaneously, the same dough was formulated without the addition of any whey protein concentrate, to serve as a control. Each of the dough formulas was mixed to peak development using the farinograph, and the sulfhydryl activity for each dough formula evaluated in terms of the equivalent proportion of L-cysteine-hydrochloride (in ppm on the flour) capable of obtaining an equivalent reduction in mix time. These results are tabulated below:

| Sample | —SH Activity of 1% Protein as ppm cysteine |
|---|---|
| Control | 0 |
| Product (1) | 18 |
| Product (2) | 38 |
| Product (3) | 36 |

The foregoing results were based on duplicate determinations in each case, and the use of the same amount of water in preparing each of the dough formulations.

EXAMPLE 2

Raw, undenatured cottage cheese whey (approximate analysis: protein 0.78%, lactose 4.31%, ash 0.75%, fat 0.03%, total solids 6.42%) was subjected to pasteurization at 161°F for 15 seconds, and passed through two stages of centrifugation to remove whey cream and protein curd fragments. The resulting clarified whey (residual butter fat — 0.05% or less) was then passed through one stage of ultrafiltration, making use of reverse osmosis type equipment operated as a membrane ultrafilter and with pressure in the equipment chamber of about 360 psig. The ultrafiltration stage comprised five modules opening in series and employing cellulose acetate membranes. The permeate or lactose fraction from the ultrafiltration was discarded, and the protein enriched fraction pumped through a gel filtration column alternatively with water to provide a second lactose fraction (discarded) and a second high protein concentrate. The latter was concentrated to about 20% solids by conventional vacuum evaporation, using temperatures below 145°F, to produce a product, analyzing on a dry solids basis: protein 62.2%, lactose 25.0%, ash 2.75%, fat 1.94 %, non-protein nitrogen 1.06%.

The foregoing liquid concentrate was processed as in Example 1 to produce: (4) a spray dried fraction; (5) a spray dried fraction dry blended with 0.4% by weight L-cysteine-hydrochloride; (6) a spray dried fraction obtained from the wet blend of such concentrate with 0.8% L-cysteine-hydrochloride. Employing a standard dough formula as in Example 1, the sulfhydryl activity of the separate fractions was determined as a reduction in mix time to peak development, in equivalent ppm cysteine with respect to a control, and the results tabulated as follows:

| Sample | —SH Activity of 1% Protein as ppm cysteine |
|---|---|
| Control | 0 |
| Product (4) | 38 |
| Product (5) | 58 |
| Product (6) | 56 |

The foregoing results show a somewhat greater sulfhydryl activity for the whey protein concentrates produced by ultrafiltration/gel filtration, than such concentrates produced as in Example 1 by electrodialysis and crystallization and removal of lactose.

EXAMPLE 3

Whey protein concentrates were produced in substantially the same manner as in Example 2, except that undenatured sweet Cheddar cheese whey was employed in place of the cottage cheese whey. The entering whey had an approximate analysis: protein 0.99%, lactose 4.61%, ash 0.52%, fat 0.05%, total solids 6.2%.

The protein enriched concentrate, obtained as in Example 2, was divided into three fractions and processed in the manner therein described to provide: (7) a spray dried product; (8) a spray dried product dry blended with 0.4% by weight L-cysteine-hydrochloride; (9) a spray dried product, obtained by wet blending the concentrate with 0.8% by weight L-cysteine-hydrochloride, and spray drying. The sulfhydryl activities of these fractions in a standard bread formulation (again compared with the control), are tabulated below:

| Sample | —SH Activity of 1% Protein as ppm cysteine |
|---|---|
| Control | 0 |
| Product (7) | 23 |
| Product (8) | 40 |
| Product (9) | 38 |

As may be noted, the sweet cheese wheys provide protein concentrates having slightly less sulfhydryl activity than the cottage cheese wheys.

EXAMPLE 4

An undenatured cottage cheese whey, as in Example 2, was pre-heated at 145°F for 30 minutes and subjected to pasteurization by heating to 161°F for 15 seconds. Thereafter the whey was passed through separate stages of centrifugation to remove the butter fat and curd fragments. Following the addition of a small amount of DEPC, to minimize bacterial contamination, the whey was passed through one stage of membrane ultrafiltration, again as in Example 2. During this treatment the operating and product temperatures ranged from 35° to 65°F, feed pressures were 360 psig, and the flux averaged 13.4 to 13.9 gal./sq. ft./day with a range between 9 and 22. The resulting protein enriched fraction was diluted with an equal volume of deionized water, and the diluted whey passed through a second stage ultrafiltration, substantially as before. In the second stage of ultrafiltration, the flux ranged from 8.7 to 28.4 gal./sq. ft./day with an average of 17. The final solids concentration in the protein fraction was about 13.3% (dry solids basis). The protein fraction was then concentrated by vacuum evaporation to produce a concentrate analyzing, on a dry solids basis: protein 59.1%, lactose 30.9%, fat 2.9%, ash less than 4.5%.

The foregoing whey protein concentrate was again processed to produce separate dried fractions, viz., (10) a spray dried product (11) a spray dried product dry blended with 0.4% by weight L-cysteine-hydrochloride; (12) a spray dried product obtained by wet blending with 0.8% by weight L-cysteine-hydrochloride, followed by spray drying. Sulfhydryl activities of the dried products, obtained by the procedure as described in the previous Examples 1–3, are tabulated below:

| Sample | —SH Activity of 1% Protein as ppm cysteine |
|---|---|
| Control | 0 |
| Product (10) | 38 |
| Product (11) | 57 |
| Product (12) | 56 |

EXAMPLE 5

Having reference to the data in each of the foregoing examples 2, 3 and 4, the sulfhydryl activity was additionally determined in standard bread formulations with respect to the liquid concentrate as identified in each of these examples, prior to processing to obtain the various dried protein products therein identified. For purposes of comparison, the sulfhydryl activity of each of the liquid concentrates is tabulated below in comparison to the sulfhydryl activity of the product subsequently obtained therefrom by means of spray drying:

| Sample | —SH Activity of 1% Protein as ppm cysteine |
| --- | --- |
| Example 2 - liquid conc. | 20 |
| Spray dried product (4) | 38 |
| Example 3 - liquid conc. | 5 |
| Spray dried product (7) | 23 |
| Example 4 - liquid conc. | 14 |
| Spray dried product (10) | 38 |

The foregoing tabulation illustrates the unexpected increase in sulfhydryl activity, measured as active available —SH groups, achieved merely by spray drying the liquid concentrate to obtain a dry product.

EXAMPLE 6

65% by weight of the liquid whey protein concentrate prepared as in Example 1 (one stage electrodialysis plus crystallization and removal of lactose) was wet blended with 35% by weight of a hot liquid mixture of dough conditioning agents (140°F), consisting 60% by weight of mono- and diglycerides of long chain fatty acids and 40% by weight ethoxylated monoglycerides of long chain fatty acids. (Such product having not more than 0.0001% BHA, BHT and citric acid added as preservatives is manufactured by the Atlas Chemical Industries under the name, Tandem 8). The heated liquid concentrate containing the added dough conditioning agent was spray dried to produce a dry, free-flowing dough developer and conditioner product in the form of an anhydrous powder which exhibited excellent shelf stability (no evidence of change, after 12 months).

The sulfhydryl activity of the resultant total dough conditioner product was determined to be substantially the same as the spray dried concentrate "product (1)" of Example 1. However, the developer and conditioner product was additionally characterized by emulsifying and conditioning properties measurable, for example, in conventional bread making processes, in terms of prolonged freshness or keeping qualities, bread softness, and greater dough strength during the processing.

While the total dough conditioner in the foregoing example was spray dried to produce an anhydrous powdered product, for a commercial product it is preferable to employ a conventional hydrate type spray dryer with a secondary dryer to form a hydrate type product.

EXAMPLE 7

A complete or total dough developer and conditioner product was prepared according to the general procedure of Example 6, except that the added dough conditioning agent (Tandem 8) was heated to a melting temperature of 140°F and a very small quantity of L-cysteine-hydrochloride (20 ppm) homogeneously dispersed therein. Thereafter, the melted dough conditioning agent containing dispersed cysteine was blended in a ribbon blender with the spray dried product (1) of Example 1. The resulting "hot melt" product was subjected to cooling and sizing, following which it could be handled as a freeflowing, essentially dry solid product. The product possessed the same properties and characteristics as the total dough conditioner of Example 6, and additionally demonstrated a pronounced stability in a moist or aqueous medium, particularly yeast brews as employed in batch or continuous-mix dough processing.

EXAMPLE 8

A modified complete or total dough developer was prepared from the liquid whey protein concentrate of Example 2 (one stage of ultrafiltration followed by a gel filtration step). The developer and conditioner product was prepared by heating 30% by weight of a dough conditioning agent consisting of 12% mono- and diglycerides of long chain fatty acids blended with 18% ethoxylated monoglycerides of long chain fatty acids (Starfol D manufactured by the Ashland Chemical Co.), at about 145°F, and wet blending with 70% by weight of the whey protein liquid concentrate of Example 2. The blend was then co-spray dried in a hydrate type spray dryer, following which a conventional tunnel dryer of the shaker type was employed to form a substantially dry, free-flowing hydrate type product. The sulfhydryl activity of the resulting dough developer and conditioner product was determined to be substantially equivalent to that of the spray dried product (4) of Example 2; whereas the dough emulsifying and conditioning characteristics were at least equivalent to those of the developer and conditioner of Example 6.

EXAMPLE 9

A commercial baking test is carried out, using the total dough developer and conditioner product of Example 6, as follows:

FORMULA

| | Pounds | Percent |
| --- | --- | --- |
| Flour (bromated, bleached, bakers) 12.1% protein, 61.5% absorption | 200 | 100.0 |
| Sugar | 10 | 5.0 |
| Lard | 6 | 3.0 |
| Salt | 3 | 1.5 |
| Yeast | 5.5 | 2.75 |
| Yeast Food (Arkady Type) | 1 | 0.5 |
| Total dough conditioner | 2 | 1.0 |
| Potassium bromate | 0.007 | 0.0035 |
| Water | 136 | 68.0 |

Procedure

1. The dry ingredients are mixed for 9 minutes at medium speed. The dough temperature out of the mixer is 87°F.

2. The mixed dough is given a floor time of 35 minutes.

3. The dough is subjected to conventional dividing, rounding, overhead proof and conventional molding.

4. The molded loaves are proofed for 60 minutes at 100°F.

5. The proofed loaves are baked for about 120 minutes at 425°F.

6. The bread is cooled, sliced and wrapped as usual.
7. Samples are scored immediately after cooling and again after 5 days.

Results

The following results compare use of the total dough conditioners of the present invention, in a standard bread mix, with use of the bread formula without added dough conditioner.

| Formula | Specific Volume | Grain | External Appearance |
| --- | --- | --- | --- |
| With dough conditioner of Example 6 | 5.6 | 9.6 | 18 |
| Without dough conditioner (control) | 4.7 | 7.0 | 11 |

In the foregoing table, the grain is measured on the basis of a perfect score of 10; external appearance on the basis of a perfect score of 20.

EXAMPLE 10

The following example is representative of the use of the total dough conditioners of Examples 6 and 7 in a commercial continuous-mix bakery process.

FORMULA

|  | Pounds | Percent |
| --- | --- | --- |
| Flour | 750 | 100 |
| Water | 455 | 60 |
| Yeast | 22.8 | 3.0 |
| Yeast food | 3 | 0.4 |
| Sugar | 40 | 5.3 |
| Lard | 22.8 | 3.0 |
| Salt | 14 | 1.9 |
| Total dough conditioner | 7.5 | 1.0 |

Procedure

1. The developer and conditioner products (Example 6 or Example 7) are mixed with the yeast, yeast food, water and 20% of the flour to form a brew (See FIG. 2, step 110).
2. After a suitable holding period (step 112), the yeast brew is continuously fed to the continuous-mixer-developer unit of an American Machine & Foundry (Amflo Model LCM) unit, and the developed dough extruded (with 1 second or less) into the pans (steps 102 and 104). The resulting dough is subjected to proofing and baking (steps 106 and 108) to produce finished bread.

Results

The results are tabulated with respect to the particular dough conditioner and developer product employed:

|  | Time in Brew, Hours | Specific Volume | Grain | External Appearance |
| --- | --- | --- | --- | --- |
| I. Example 6 (150 rpm) | 0 | 6.26 | 10.4 | 21 |
|  | 1 | 6.07 | 10.4 | 25 |
|  | 2 | 6.37 | 9.7 | 27 |
| II. Example 7 (150 rpm) | 0 | 6.30 | 10.2 | 27 |
|  | ½ | 5.94 | 10.1 | 25 |

-Continued

|  | Time in Brew, Hours | Specific Volume | Grain | External Appearance |
| --- | --- | --- | --- | --- |
|  | 1 | 5.92 | 9.7 | 24 |
|  | 1½ | 6.0 | 10.1 | 27 |

The foregoing results illustrate the benefit of use of the total dough conditioner of the present invention in continuous-mix bread processing. In such processing, grain is measured on the basis of a perfect score of 11, external appearance on the basis of a perfect score of 30.

EXAMPLE 11

Following the continuous-mix procedure of Example 10, bread was produced by substantially identical procedures, except that the total dough conditioner was produced by alternate procedures. In one procedure, the dough developer and conditioner product was prepared as in Example 8. This procedure is referred to in the tabulated results as run A. In the other procedure, the dough conditioner was prepared by blending in aqueous solution in one tank, the same proportions of whey protein concentrate and dough conditioning agent (Starfol D), as in Example 8. The resulting aqueous solution is added to the brew in sufficient quantity to provide 1% by weight protein on the flour.

The results with respect to bread made with these alternative procedures is set forth in the following table:

|  | Specific Volume | Grain | External Appearance |
| --- | --- | --- | --- |
| Run A | 5.85 | 9.5 | 14 |
| Run B | 5.20 | 7.1 | 6 |

The results indicate the synergistic effect of cospray drying the whey protein concentrate with the liquid dough conditioning agent, as opposed to merely mixing these ingredients in aqueous solution prior to adding to the mix. Specifically, the co-spray dried product produces measurably improved results as compared to use of the developer and conditioner product in aqueous form.

We claim:

1. In a process for producing a gluten reactive protein concentrate particularly adapted for use in the bakery trade, the steps of subjecting liquid whey to at least one membrane filtration step to obtain a protein rich fraction, concentrating said protein rich fraction to produce a protein concentrate, and homogeneously blending said protein concentrate with from 0.2 to 1.0% by weight on a dry solids basis of a gluten activating agent selected from the group consisting of cysteine, glutathione, sulfite salts and mixtures thereof, to thereby obtain a final protein containing product, the protein content of said final product being in water soluble form and possessing a degree of sulfhydryl activity in terms of active available —SH groups at a 1% level of protein on the flour in a dough system equivalent to the sulfhydryl activity of 10 to 50 ppm of L-cysteine-hydrochloride.

2. A process as in claim 1 wherein said membrane filtration step is carried out by subjecting said liquid whey to at least one stage of membrane electrodialysis, followed by crystallization and removal of lactose from said protein rich fraction.

3. A process as in claim 1 wherein said membrane filtration step is carried out by subjecting said liquid whey to at least one stage of membrane ultrafiltration.

4. A process as in claim 1 wherein said membrane filtration step is carried out by subjecting said liquid whey to at least one stage of membrane ultrafiltration followed by at least one stage of gel filtration.

5. A process as in claim 1 wherein, said protein rich whey fraction is subjected to at least one additional stage of membrane filtration to increase the protein content of said protein rich fraction and is subsequently spray dried.

6. A process as in claim 1 wherein said gluten activating agent is added to said protein concentrate to form a wet blend, and the wet blend is spray dried to produce a freeflowing substantially dry protein product.

7. A process as in claim 1 wherein said protein concentrate is spray dried to produce a dry free-flowing substantially dry protein product, following which the gluten activating agent is dry blended with said protein product.

8. In a process for producing a gluten reactive protein concentrate particularly adapted for use in the bakery trade as a dough developer and conditioner, the steps of subjecting liquid whey containing soluble protein to at least one membrane filtration step to obtain a protein rich fraction, mixing said protein rich fraction with from 5 to 50% by weight of the mixture of a dough conditioning agent selected from the group consisting of monoglycerides of long chain fatty acids, diglycerides of long chain fatty acids, ethoxylated monoglycerides of long chain fatty acids, polyoxyethylene sorbitan esters of long chain fatty acids, sodium stearoyl lactylates, calcium stearoyl lactylates, and mixtures thereof, and solidifying said mixture of protein rich fraction and dough conditioning agent to form a substantially free-flowing protein concentrate wherein the protein content is in water soluble form, said protein concentrate being characterized by dough emulsifying and conditioning properties and a degree of sulfhydryl activity in terms of active available —SH groups at a 1% level of protein on the flour in a dough system equivalent to the sulfhydryl activity of 10 to 50 ppm of L-cysteine hydrochloride.

9. A process as in claim 8 wherein said dough conditioning agent is a mixture of mono- and diglycerides of long chain fatty acids and ethoxylated monoglycerides of long chain fatty acids.

10. A process as in claim 8 wherein said dough conditioning agent is a mixture of mono- and diglycerides of long chain fatty acids and polyoxyethylene sorbitan esters of long chain fatty acids.

11. A process as in claim 8 wherein said dough conditioning agent is a mixture of sodium and calcium stearoyl lactylates.

12. A process as in claim 8 wherein said dough conditioning agent is melted and mixed in liquid form with a spray dried quantity of said protein rich fraction, and the mixture is cooled to form said substantially dry, free-flowing protein and concentrate.

13. A process as in claim 8 wherein said dough conditioning agent is blended in liquid form with said protein rich fraction, and the blend is thereafter spray dried to obtain said substantially dry free-flowing protein concentrate.

14. A process as in claim 8 including the steps of wet blending said mixture of protein rich fraction and dough conditioning agent, mixing the blend with from 0.2 to 1.0% by weight on a dry solids basis of a gluten activating agent selected from the group consisting of cysteine, glutathione, sulfite salts and mixtures thereof, and thereafter spray drying the same to form a dry free-flowing protein concentrate characterized by enhanced gluten reactivity.

15. A process as in claim 8 including the steps of dry blending said substantially dry free-flowing protein concentrate with from 0.1 to 0.5% by weight on a dry solids basis of a gluten activating agent selected from the group consisting of cysteine, glutathione, sulfite salts and mixtures thereof, to thereby obtain a dry free-flowing protein concentrate characterized by enhanced gluten activity.

16. In a process for producing a gluten reactive water soluble dough developer and conditioner particularly adapted for use in the bakery trade, the steps of subjecting liquid whey containing protein in native, undenatured form to at least one membrane filtration step to obtain a protein rich fraction, blending said protein rich fraction with a dough conditioning agent selected from the group consisting of monoglycerides of long chain fatty acids, diglycerides of long chain fatty acids, ethoxylated monoglycerides of long chain fatty acids, polyoxyethylene sorbitan esters of long chain fatty acids, sodium stearoyl lactylates, calcium stearoyl lactylates, and mixtures thereof, said dough conditioning agent comprising from 5 to 50% by weight of said blend, concentrating said blend containing the protein rich fraction and dough conditioning agent, and spray drying said concentrated blend to produce a dry free-flowing protein concentrate wherein the protein content is in water soluble form, said protein concentrate being characterized by dough emulsifying and conditioning properties and a degree of sulfhydryl activity in terms of active available —SH groups at a 1% level of protein on the flour in a dough system equivalent to the sulfhydryl activity of 10 to 50 ppm of L-cysteine hydrochloride.

17. A process as in claim 16 wherein said membrane filtration step is carried out by subjecting said liquid whey to at least one stage of membrane electrodialysis, followed by crystallization and removal of lactose from said protein rich fraction.

18. A process as in claim 16 wherein said membrane filtration step is carried out by subjecting said liquid whey to at least one stage of membrane ultrafiltration.

19. A process as in claim 16 wherein said membrane filtration step is carried out by subjecting said liquid whey to at least one stage of membrane ultrafiltration followed by at least one stage gel filtration.

20. A process as in claim 16 wherein prior to spray drying said concentrated protein rich whey fraction is subjected to at least one additional stage of membrane filtration to effect an increase in the protein content of said protein rich fraction.

21. A dough developer and conditioner product for use in the bakery trade, in the form of water soluble gluten reactive protein concentrate having dough emulsifying and conditioning properties, said dough developer and conditioner product being in substantially dry free-flowing form and consisting essentially on a dry solids basis of from 50 to 95% protein concentrate derived from whey, and from 5 to 50% of a dough conditioning agent selected from a group consisting of monoglycerides of long chain fatty acids, diglycerides of long chain fatty acids, ethoxylated monoglycerides of long chain fatty acids, polyoxyethylene sorbitan esters of long chain fatty acids, sodium stearoyl lactylates, calcium stearoyl lactylates, and mixtures thereof, the protein content of said product being in water soluble undenatured form and processing a degree of sulfhydryl activity in terms of active available —SH groups at a 1% level of protein on the flour in a dough system equivalent to the sulfhydryl activity of 10 to 50 ppm or L-cysteine-hydrochloride, said dough conditioner product additionally possessing emulsifying and dough conditioning properties in said dough system.

22. A dough developer and conditioner product as in claim 21 in which the protein content of the protein concentrate constitutes from about 30 to 80% of the weight thereof, on a dry solids basis.

23. A dough developer claim 21 conditioner product as in claim 21 in which said conditioning agent is a mixture of mono- and diglycerides of long chain fatty acids with ethoxylated monoglycerides of long chain fatty acids.

24. A product as in claim 21 in which said dough conditioning agent is a mixture of mono- and diglycerides of long chain fatty acids with polyoxyethylene sorbitan esters of long chain fatty acids.

25. A product as in claim 21 in which said dough conditioning agent is a mixture of sodium and calcium stearoyl lactylates.

26. A dough conditioner product for use in the bakery trade, such product being gluten reactive, water soluble and possessing emulsifying and dough conditioning properties, said dough conditioner product consists essentially of the following ingredients:

|  | Percent |
| --- | --- |
| whey protein | 10 to 65 |
| non-protein whey derivative | 15 to 75 |
| dough conditioning agent | 5 to 50 |
| gluten activating agent | 0.1 to 1.0 | said whey protein being substantially in native, undenatured soluble form, said non-protein whey derivative having a lactose content less than about 35% and a mineral salt content less than about 10% (dry solids basis), said dough conditioning agent being selected from the group consisting of monoglycerides of long chain fatty acids, diglycerides of long chain fatty acids, ethoxylated monoglycerides of long chain fatty acids polyoxyethylene sorbitan esters of long chain fatty acids, sodium stearoyl lactylates, calcium stearoyl lactylates, and mixtures thereof, said gluten activating agent being selected from the group consisting of cysteine, glutathione, sulfite salts and mixtures thereof.

27. In a baking process wherein conventional ingredients including flour, water and yeast are mixed to form a dough, the step of adding to said dough mixture a dough developer and conditioner in the form of a water soluble gluten reactive protein concentrate, said protein concentrate being in substantially dry, free-flowing form and consisting essentially of a protein concentrate derived from whey, said protein concentrate being present in an amount ranging from 0.5 to 0.2% on the weight of the flour, the protein content of said protein concentrate being in water soluble undenatured form and possessing a degree of sulfhydryl activity in terms of active available —SH groups at a 1% level of protein on the flour in said dough equivalent to the sulfhydryl activity of 10 to 50 ppm of L-cysteine hydrochloride, mixing said dough ingredients including said dough developer and conditioner to form a dough, developing said dough while simultaneously subjecting the same to the gluten activating and dough modifying activity of the protein content of said dough developer and conditioner, dividing the resulting developed dough into units for baking and thereafter proofing and baking the same to form high quality bakery products.

28. A baking process as in claim 27 wherein said dough developer and conditioner additionally includes dough conditioning agent selected from the group consisting of monoglycerides of long chain fatty acids, diglycerides of long chain fatty acids, ethoxylated monoglycerides of long chain fatty acids, polyoxyethylene sorbitan esters of long chain fatty acids, sodium stearoyl lactylates, calcium stearoyl lactylates, and mixtures thereof, said dough developer and conditioner being added to said mixture of dough ingredients in substantially dry, free-flowing form and consisting essentially on a dry solids basis of from 50 to 95% of said whey protein concentrate and from 5 to 50% of said added dough conditioning agent.

* * * * *

UNITED STATES PATENT AND TRADEMARK OFFICE
CERTIFICATE OF CORRECTION

PATENT NO. : 3,876,805
DATED : April 8, 1975
INVENTOR(S) : Theodore W. Craig et al It is certified that error appears in the above-identified patent and that said Letters Patent are hereby corrected as shown below:

Claim 14, line 5, change "activiating" to --activating--.

Claim 27, line 9, change "0.5 to 0.2%" to --0.5 to 2.0%--.

Claim 21, line 16, change "processing" to --possessing--;

line 19, after "ppm" change "or" to --of--.

Claim 23, line 1, after "developer" delete "claim 21"

and insert --and--.

Claim 26, line 18, before "poly-" insert a comma-- , --.

Signed and Sealed this

Fourteenth Day of September 1976

[SEAL]

Attest:

RUTH C. MASON
Attesting Officer

C. MARSHALL DANN
Commissioner of Patents and Trademarks